(12) United States Patent
Ishihara et al.

(10) Patent No.: US 10,480,098 B2
(45) Date of Patent: Nov. 19, 2019

(54) FILAMENT FOR 3D PRINTING AND METHOD FOR PRODUCING CRYSTALLINE SOFT RESIN MOLDED ARTICLE

(71) Applicants: MCPP Innovation LLC, Chiyoda-ku (JP); Mitsubishi Chemical Corporation, Tokyo (JP)

(72) Inventors: Toshihisa Ishihara, Mie (JP); Shigeyuki Furomoto, Tokyo (JP)

(73) Assignees: MCPP Innovation LLC, Chiyoda-ku (JP); Mitsubishi Chemical Corporation, Tokyo (JP)

( * ) Notice: Subject to any disclaimer, the term of this patent is extended or adjusted under 35 U.S.C. 154(b) by 171 days.

(21) Appl. No.: 15/449,495

(22) Filed: Mar. 3, 2017

(65) Prior Publication Data

US 2017/0173869 A1 Jun. 22, 2017

Related U.S. Application Data

(63) Continuation of application No. PCT/JP2015/075234, filed on Sep. 4, 2015.

(30) Foreign Application Priority Data

Sep. 5, 2014 (JP) .................................. 2014-181214

(51) Int. Cl.
*D01F 6/86* (2006.01)
*B29C 67/00* (2017.01)
(Continued)

(52) U.S. Cl.
CPC ................ *D01F 6/86* (2013.01); *B29C 35/02* (2013.01); *B29C 67/00* (2013.01); *B29C 64/112* (2017.08);
(Continued)

(58) Field of Classification Search
CPC ............ D01F 6/86; B29C 64/20; B29C 35/02
See application file for complete search history.

(56) References Cited

U.S. PATENT DOCUMENTS

| 5,009,955 A | 4/1991 | Abu-Isa |
| 5,153,065 A | 10/1992 | Abu-Isa |

(Continued)

FOREIGN PATENT DOCUMENTS

| JP | 2003-502184 | 1/2003 |
| JP | 2003-534159 | 11/2003 |

(Continued)

OTHER PUBLICATIONS

Extended European Search Report dated Aug. 22, 2017 in European Patent Application No. 15837968.5.

(Continued)

*Primary Examiner* — Andrew T Piziali
(74) *Attorney, Agent, or Firm* — Oblon, McClelland, Maier & Neustadt, L.L.P.

(57) ABSTRACT

The present invention provides a filament for three-dimensional printer molding which includes a resin that can be molded by a three-dimensional printer in a wide temperature range and from which a crystalline soft resin molded article excellent in terms of flexible texture etc. can be produced; and a method for producing a crystalline soft resin molded article, wherein the filament for three-dimensional printer molding includes a polyester-based thermoplastic elastomer wherein a durometer D hardness (JIS K6253-1993) is 40 or less and thermal properties measured with a differential scanning calorimeter satisfy the following conditions:

a melting peak temperature (A) is 120 to 220° C. by heating at 10° C./min;
a crystallization peak temperature (B) is 60 to 160° C. by cooling at 10° C./min; and (Continued)

the crystallization peak observed during cooling at 10° C./min has a half-value temperature width of 10 to 30° C.

10 Claims, 1 Drawing Sheet

(51) Int. Cl.

| | | |
|---|---|---|
| *B29C 35/02* | (2006.01) | |
| *B33Y 70/00* | (2015.01) | |
| *B33Y 10/00* | (2015.01) | |
| *B33Y 30/00* | (2015.01) | |
| *B29K 67/00* | (2006.01) | |
| *B29C 64/112* | (2017.01) | |
| *B29C 64/40* | (2017.01) | |

(52) U.S. Cl.
CPC .......... *B29C 64/40* (2017.08); *B29K 2067/00* (2013.01); *B29K 2995/007* (2013.01); *B33Y 10/00* (2014.12); *B33Y 30/00* (2014.12); *B33Y 70/00* (2014.12)

(56) References Cited

U.S. PATENT DOCUMENTS

| | | |
|---|---|---|
| 2007/0132158 A1 | 6/2007 | Martinoni et al. |
| 2010/0016539 A1 | 1/2010 | Kohno et al. |
| 2012/0231225 A1 | 9/2012 | Mikulak et al. |
| 2013/0224423 A1 | 8/2013 | Mikulak et al. |
| 2016/0068693 A1* | 3/2016 | Zhou .................... C09D 11/104 524/605 |
| 2016/0177078 A1* | 6/2016 | Naito .................... C08L 25/12 264/109 |
| 2016/0185050 A1* | 6/2016 | Topolkaraev ......... B29C 64/329 |

FOREIGN PATENT DOCUMENTS

| | | |
|---|---|---|
| JP | 2008-194968 | 8/2008 |
| JP | 2008-240229 | 10/2008 |
| JP | 2008-260877 | 10/2008 |
| JP | 2010-521339 | 6/2010 |
| KR | 10-1391293 B1 | 5/2014 |
| WO | WO 00/78519 A1 | 12/2000 |
| WO | WO 01/89714 A1 | 11/2001 |
| WO | WO 01/89814 A1 | 11/2001 |
| WO | WO 2005/025839 A1 | 3/2005 |
| WO | WO 2008/010607 A1 | 1/2008 |
| WO | WO 2008/112061 A1 | 9/2008 |
| WO | WO 2015/037574 A1 | 3/2015 |

OTHER PUBLICATIONS

International Search Report dated Nov. 24, 2015 in PCT/JP2015/075234, filed on Sep. 4, 2015 (with English Translation).

Written Opinion dated Nov. 24, 2015 in PCT/JP2015/075234, filed on Sep. 4, 2015.

Maureen Brennan, "Ninjaflex Press Release for Immediate Release, Ninjaflex™ 3D Printer Filament Revolutionizing the 3D Desktop Printer, New 3D Printer Filament Is Flexible, Reliable and Compatible with Most 3D Printers," http://www.fennerdrives.com/FetohFile.ashx?id=387738o2-1226-44eb-b81a-2334f83be180, May 1, 2014, pp. 3.

Office Acton dated Sep. 3, 2019 in the corresponding Japanese patent application No. 2015-174888 and machine translation.

* cited by examiner

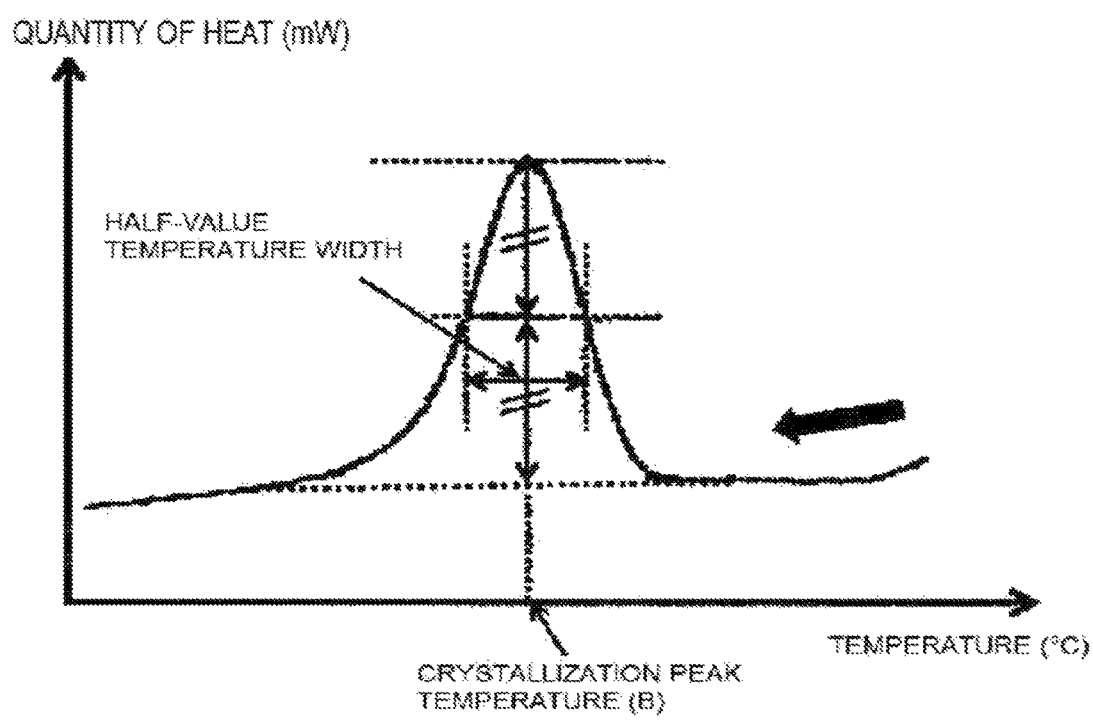

FILAMENT FOR 3D PRINTING AND METHOD FOR PRODUCING CRYSTALLINE SOFT RESIN MOLDED ARTICLE

TECHNICAL FIELD

The present invention relates to a filament for three-dimensional printer molding and a method for producing a crystalline soft resin molded article. More particularly, the invention relates to a filament for three-dimensional printer which includes a resin which can be molded by a three-dimensional printer in a wide temperature range without excessively elevating the temperature at which the resin is extruded by the three-dimensional printer; and which gives a crystalline soft resin molded article which has a flexible texture and is excellent in terms of shape reproducibility, shape retentivity, heat resistance, etc., and to a method for producing a crystalline soft resin molded article. The present invention further relates to a roll body of the filament for three-dimensional printer and a cartridge which contains the roll body therein and is to be mounted in or on a three-dimensional printer.

BACKGROUND ART

At present, three-dimensional printers which run on various additive manufacturing technologies (e.g., the binder ejection technology, material extrusion technology, and liquid-tank photopolymerization technology) are on the market. Of these, three-dimensional printer systems running on the material extrusion technology (e.g., the system manufactured by Stratasys Inc., U.S.A.) are used for building a three-dimensional object layer-by-layer by extruding a flowable raw material from a nozzle part provided to an extrusion head, on the basis of a computer-aided design (CAD) model.

In a fused deposition modeling (hereinafter often referred to as FDM) method among such technologies, a raw material is first inserted, as a filament constituted of a thermoplastic resin, into an extrusion head and continuously extruded, while being fused, from the nozzle part provided to the extrusion head onto the X-Y plane within the chamber. The resin extruded is deposited on and fused to a resin deposit which has already been formed, then solidifies as the extruded resin cools, and is integrated therewith. The FDM method has come to be extensively used because this method is practiced by such a simple system.

In a three-dimensional printer running on the FDM method or the like, the extrusion step is usually repeated while the nozzle position relative to the platen rises in the Z-axis direction, which is perpendicular to the X-Y plane, thereby building a three-dimensional object akin to a CAD model (patent documents 1 and 2).

Hitherto, amorphous thermoplastic resins such as acrylonitrile/butadiene/styrene resins (hereinafter often referred to as "ABS resins") or polylactic acid (hereinafter often referred to as "PLA resins") have generally been used in preference as raw materials for the FDM method, from the standpoint of processability or flowability (patent documents 3 and 4).

Meanwhile, ABS resins or PLA resins generally are rigid materials, and there are hence cases where these resins cannot meet the requirements which are diversifying day by day. For example, in the case where a flexible three-dimensional object, such as the cover of a smartphone or the cap of a container, is desired to be formed, use of a soft resin as the material resin is desirable.

As soft resins for application to molding by three-dimensional printers, ones based on a thermoplastic urethane resin material (e.g., "NINJAFLEX (registered trademark)", manufactured by FENNER DRIVES, Inc.) are on the market (non-patent document 1).

PRIOR ART DOCUMENTS

Patent Documents

Patent Document 1: JP-T-2003-502184
Patent Document 2: JP-T-2003-534159
Patent Document 3: JP-T-2010-521339
Patent Document 4: JP-A-2008-194968

Non-Patent Document

Non-Patent Document 1: NINJAFLEX PRESS RELEASE FOR IMMEDIATE RELEASE Contact: Maureen Brennan 312-946-6075, [online], May 1, 2014, [retrieved on Aug. 19, 2014], Internet <URL: http://www.fennerdrives.com/FetchFile.ashx?id=387738c2-1226-44eb-b81a-2334f83be180>

SUMMARY OF THE INVENTION

Problems that to be Solved by the Invention

As a result of diligent investigations made by the present inventors, it was found that the prior-art techniques have the following problems.

Although patent document 2 describes a larger number of resins which are usable as filaments, the document shows no properties that are required of a material to be used as filaments. ABS resins such as that described in patent document 3 have problems in that the resins show large warpage after molding and it is hence difficult to obtain therefrom a desired molded article having high dimensional accuracy and that in applications where heat resistance, transparency, and surface hardness are required, the ABS resins cannot satisfy the practical properties from the standpoint of material property. Furthermore, the PLA resin described in patent document 4 has considerably low heat resistance, although attaining excellent dimensional accuracy, and has a problem in that the molded article obtained therefrom undesirably deforms due to frictional heat caused by grinding after the molding.

Meanwhile, filaments of thermoplastic urethane resin materials, such as "NINJAFLEX (registered trademark)" manufactured by FENNER DRIVES Inc., were found to have a problem in that in cases when such a filament is supplied to an extrusion head, the filament tends to bend just before the extrusion head, making the filament supply difficult, and that it is hence necessary that the set temperature of the extrusion head should be elevated.

In addition, since a low temperature set at extrusion-head tends to result in appearance failures such as strings (fragments formed by thinly elongating the molten resin), it is necessary that the set temperature of the extrusion head should be high. It was found that in cases when thermoplastic urethane resins are used for molding under such conditions, there is a problem, for example, in that the molding speed decreases or the accuracy of the molded article decreases due to burning, sinking, or warpage (deformation or discoloration of the molded article).

An object of the present invention, in view of the problems of prior-art techniques described above, is to provide a filament for three-dimensional printer which can be molded by a three-dimensional printer in a wide temperature range without excessively elevating the temperature at which the resin is extruded by the three-dimensional printer; and is excellent in terms of heat resistance, flexible texture, shape reproducibility, shape retentivity, etc., and to provide a method for producing a crystalline soft resin molded article.

Means for Solving the Problems

The present inventors diligently made investigations in order to overcome the problems and, as a result, have discovered that the problems can be solved by using a polyester-based thermoplastic elastomer having specific hardness and thermal properties as a raw material and subjecting this raw material to molding with a three-dimensional printer.

Specifically, summary of the present invention are the following [1] to [15].

[1] A filament for three-dimensional printer molding which includes a polyester-based thermoplastic elastomer wherein a durometer D hardness (JIS K6253-1993) is 40 or less and thermal properties measured with a differential scanning calorimeter (DSC) satisfy the following conditions:

a melting peak temperature (A) is 120 to 220° C. by heating at 10° C./min;

a crystallization peak temperature (B) is 60 to 160° C. by cooling at 10° C./min; and the crystallization peak observed during cooling at 10° C./min has a half-value temperature width of 10 to 30° C.

[2] The filament for three-dimensional printer according to [1], wherein the thermal properties of the polyester-based thermoplastic elastomer which are measured with a differential scanning calorimeter (DSC) further satisfy the following:

the difference between the melting peak temperature (A) and the crystallization peak temperature (B) is 40 to 80° C.

[3] The filament for three-dimensional printer according to [1] or [2], which has a filament diameter of 1.0 to 5.0 mm.

[4] The filament for three-dimensional printer according to any one of [1] to [3], wherein the polyester-based thermoplastic elastomer is a polybutylene terephthalate-polyalkylene glycol block copolymer.

[5] The filament for three-dimensional printer according to any one of [1] to [4], wherein the surface has been coated with a silicone oil.

[6] The filament for three-dimensional printer according to any one of [1] to [5], which has an accuracy in filament diameter of within ±5% with respect to any measuring point on the filament.

[7] The filament for three-dimensional printer according to any one of [1] to [6], which has a water content of 3,000 ppm or less.

[8] A roll body of the filament for three-dimensional printer according to any one of [1] to [7].

[9] A cartridge to be mounted in or on a three-dimensional printer, which contains the roll body according to [8] therein.

[10] A product which is sealed to the filament for three-dimensional printer according to any one of [1] to [7] have a water content of 3,000 ppm or less.

[11] A method for producing a crystalline soft resin molded article, wherein a polyester-based thermoplastic elastomer which has a durometer D hardness (JIS K6253-1993) of 40 or less and has thermal properties measured with a differential scanning calorimeter (DSC) satisfying the following conditions:

a melting peak temperature (A) is 120 to 220° C. by heating at 10° C./min;

a crystallization peak temperature (B) is 60 to 160° C. by cooling at 10° C./min; and the crystallization peak observed during cooling at 10° C./min has a half-value temperature width of 10 to 30° C., is used as raw material and the raw material is molded with a three-dimensional printer.

[12] The method for producing a crystalline soft resin molded article according to [11], wherein the thermal properties of the polyester-based thermoplastic elastomer which are measured with a differential scanning calorimeter (DSC) further satisfy the following condition:

the difference between the melting peak temperature (A) and the crystallization peak temperature (B) is 40 to 80° C.

[13] The method for producing a crystalline soft resin molded article according to [11] or [12], wherein a temperature of a molten resin which is extruded from an extrusion head of the three-dimensional printer is 180 to 250° C.

[14] The method for producing a crystalline soft resin molded article according to any one of [11] to [13], wherein the molding with the three-dimensional printer is based on a fused deposition modeling method.

[15] The method for producing a crystalline soft resin molded article according to any one of [11] to [14], wherein the molding with the three-dimensional printer is conducted by extruding a molten resin from the extrusion head into a strand shape having a diameter of 0.01 to 1 mm.

Effects of the Invention

According to the filament for three-dimensional printer of the invention, a crystalline soft resin can be molded by a three-dimensional printer in a wide temperature range without excessively elevating the temperature at which the resin is extruded by the three-dimensional printer. Furthermore, according to the method of the invention for producing a crystalline soft resin molded article, it is possible to obtain a crystalline soft resin molded article which is excellent in terms of heat resistance, flexible texture, shape reproducibility, shape retentivity, etc.

BRIEF DESCRIPTION OF THE DRAWING

FIG. 1 is a drawing for explaining a crystallization peak temperature (B), crystallization, and the half-value temperature width.

MODES FOR CARRYING OUT THE INVENTION

Embodiments of the method of the invention for producing a crystalline soft resin molded article are explained below in detail. The present invention should not be construed as being limited to the following explanations, and can be modified accordingly without departing from the spirit of the invention. In this description, each expression including "to" interposed between numerical values or property values means that the range includes the values on both sides of the "to".

[Filament for Three-Dimensional Printer and Method for Producing Crystalline Soft Resin Molded Article]

The filament for three-dimensional printer molding of the invention includes a polyester-based thermoplastic elastomer wherein a durometer D hardness (JIS K6253-1993) is 40 or less and thermal properties measured with a differential scanning calorimeter (DSC) satisfy the following conditions:

a melting peak temperature (A) is 120 to 220° C. by heating at 10° C./min;

a crystallization peak temperature (B) is 60 to 160° C. by cooling at 10° C./min; and the crystallization peak observed during cooling at 10° C./min has a half-value temperature width of 10 to 30° C.

The method of the invention for producing a crystalline soft resin molded article is characterized by:

using a polyester-based thermoplastic elastomer which has a durometer D hardness (JIS K6253-1993) of 40 or less and has thermal properties measured with a differential scanning calorimeter (DSC) satisfying the following conditions:

a melting peak temperature (A) is 120 to 220° C. by heating at 10° C./min;

a crystallization peak temperature (B) is 60 to 160° C. by cooling at 10° C./min; and the crystallization peak observed during cooling at 10° C./min has a half-value temperature width of 10 to 30° C., as raw material and molding the raw material with a three-dimensional printer.

Hereinafter, the method of the invention for producing a crystalline soft resin molded article is often referred to simply as "production method of the invention". The crystalline soft resin molded article obtained by the production method of the invention is often referred to as "crystalline soft resin molded article of the invention".

<Polyester-Based Thermoplastic Elastomer>

The polyester-based thermoplastic elastomer to be used in the invention is one in which the durometer D hardness (JIS K6253-1993) and/or the durometer A hardness (JIS K6253-1993) can be measured, and the durometer D hardness is 40 or less.

Durometer hardness is measured by pushing an indenter provided to the end of a spring against the resin surface and is expressed in terms of the numerical value indicated by the device. The hardnesses are classified into durometer D hardness and durometer A hardness by the shape of the indenter and by a difference in spring. Durometer D hardness is used for a higher-hardness region, while durometer A hardness is used for a lower-hardness region. The hardnesses in a region where the durometer D hardness is low overlap the hardnesses in a region where the durometer A hardness is high.

In case where the durometer D hardness of the polyester-based thermoplastic elastomer exceeds 40, this polyester-based thermoplastic elastomer is too hard in molding with three-dimensional printers, resulting in an impaired feel. Such too high durometer D hardnesses are hence undesirable. From this standpoint, the durometer D hardness thereof is preferably 35 or less, more preferably 30 or less.

Meanwhile, there is no particular lower limit on the hardness of the polyester-based thermoplastic elastomer. However, from the standpoint of facilitating insertion of the filament for three-dimensional printer into the extrusion head when performing molding with a three-dimensional printer, the durometer A hardness thereof is preferably 70 or higher, more preferably 80 or higher.

The polyester-based thermoplastic elastomer to be used in the invention has thermal properties measured with a differential scanning calorimeter (DSC) which satisfy the requirements:

a melting peak temperature (A) is 120 to 220° C. by heating at 10° C./min;

a crystallization peak temperature (B) is 60 to 160° C. by cooling at 10° C./min; and the crystallization peak observed during cooling at 10° C./min has a half-value temperature width of 10 to 30° C.

The polyester-based thermoplastic elastomer to be used in the invention has a melting peak temperature (A) during heating at 10° C./min (hereinafter often referred to as "melting peak temperature (A)") of 120° C. or higher. When the melting peak temperature (A) of the polyester-based thermoplastic elastomer is lower than 120° C., there are cases where the molded article obtained therefrom is deformed by heat generated when grinding the molded article or by heat during storage or has impaired heat resistance. Such too low melting peak temperatures are hence undesirable. From the standpoint of improving these properties, the melting peak temperature (A) is preferably 140° C. or higher.

Meanwhile, the melting peak temperature (A) of the polyester-based thermoplastic elastomer is preferably 220° C. or lower. In case where the melting peak temperature (A) of the polyester-based thermoplastic elastomer is higher than 220° C., it is necessary to use an elevated set temperature when subjecting this elastomer to three-dimensional molding. Such too high melting peak temperatures are hence undesirable. From this standpoint, it is preferable that the melting peak temperature (A) should be 210° C. or lower. In the present invention, the term "melting peak temperature (A)" means the temperature corresponding to the position of the top of an endothermic peak detected with a DSC during the period when the polyester-based thermoplastic elastomer in a crystalline state is heated.

The polyester-based thermoplastic elastomer to be used in the invention has a crystallization peak temperature (B) during cooling at 10° C./min (hereinafter often referred to as "crystallization peak temperature (B)") of 60° C. or higher. In case where the crystallization peak temperature (B) of the polyester-based thermoplastic elastomer is lower than 60° C., this elastomer cannot retain the shape and deforms just after molding. Such too low crystallization peak temperatures are hence undesirable. From this standpoint, it is preferable that the crystallization peak temperature (B) of the polyester-based thermoplastic elastomer should be 70° C. or higher.

Meanwhile, the crystallization peak temperature (B) of the polyester-based thermoplastic elastomer is 160° C. or lower. In case where the crystallization peak temperature (B) of the polyester-based thermoplastic elastomer is higher than 160° C., this elastomer shows enhanced crystal shrinkage, resulting in impaired molding accuracy. From these standpoints, it is preferable that the crystallization peak temperature (B) of the polyester-based thermoplastic elastomer should be 150° C. or lower. In the present invention, the term "crystallization peak temperature (B)" means the temperature corresponding to the position of the top of an exothermic peak detected with a DSC during the period when the polyester-based thermoplastic elastomer in a molten state is cooled.

As will be described later, polyester-based thermoplastic elastomers usually have hard segments and soft segments. The melting peak temperature (A) and crystallization peak temperature (B) of such polyester-based thermoplastic elastomer each tend to become higher as the content of hard segments increases, and each tend to become higher as the molecular weight of the hard segments increases. Because of this, by regulating the hard segments and the soft segments, the values of melting peak temperature (A) and crystallization peak temperature (B) can be controlled.

In the polyester-based thermoplastic elastomer to be used in the invention, the crystallization peak observed when the elastomer is cooled at 10° C./min has a half-value temperature width of 10° C. or larger. In case where the half-value temperature width of the crystallization peak of the polyester-based thermoplastic elastomer is smaller than 10° C., warpage due to crystal shrinkage occurs. Such too small half-value temperature widths thereof are hence undesirable. From this standpoint, it is preferable that the half-value temperature width of the crystallization peak of the polyester-based thermoplastic elastomer should be 15° C. or larger. Meanwhile, the half-value temperature width of the crystallization peak of the polyester-based thermoplastic elastomer is 30° C. or smaller. When the half-value temperature width of the crystallization peak of the polyester-based thermoplastic elastomer exceeds 30° C., there are cases where stringing occurs, resulting in an impaired appearance or impaired molding accuracy. Such too large half-value temperature widths are hence undesirable. From these standpoints, it is preferable that the half-value temperature width of the crystallization peak should be 25° C. or smaller.

In the present invention, the term "half-value temperature width of the crystallization peak" has the following meaning. A base line is drawn for the exothermic peak detected with a DSC during the period when the polyester-based thermoplastic elastomer in a molten state is cooled. That term means the temperature width of the exothermic peak as measured at the position where the height of the peak top from the base line is halved (FIG. 1).

The half-value temperature width of the crystallization peak tends to become larger as the content of soft segments decreases and to become larger as the molecular weight of the soft segments increases. It is also possible to obtain an increased value of half-width temperature width by using in combination a plurality of polyester-based thermoplastic elastomers differing in the value of crystallization peak (B).

It is preferable that the polyester-based thermoplastic elastomer to be used in the invention should be one in which the difference between the melting peak temperature (A) and the crystallization peak temperature (B) [value obtained by subtracting the value of crystallization peak temperature (B) from the value of melting peak temperature (A)] is 40° C. or larger. In cases when the difference therebetween is 40° C. or larger, the shapability tends to be better and the deformation due to sinking or warpage is less apt to occur. Such large differences therebetween are hence preferred. Form this standpoint, it is more preferable that the difference between the melting peak temperature (A) and the crystallization peak temperature (B) should be 50° C. or larger.

Meanwhile, it is preferable that the difference between the melting peak temperature (A) and crystallization peak temperature (B) of the polyester-based thermoplastic elastomer should be 80° C. or less. In the case where the difference therebetween is 80° C. or less, the shapability tends to be better and the molded article can retain the shape accurately. Such differences therebetween are hence preferred. From this standpoint, it is more preferable that the difference between the melting peak temperature (A) and the crystallization peak temperature (B) should be 70° C. or less.

The difference between the melting peak temperature (A) and the crystallization peak temperature (B) can be controlled by regulating the content and molecular weight of soft segments. Specifically, the difference between the melting peak temperature (A) and the crystallization peak temperature (B) tends to become larger as the content of soft segments increases, and tends to become larger as the molecular weight of the soft segments increases.

The melt flow rate (MFR) of the polyester-based thermoplastic elastomer to be used in the invention is not particularly limited. However, the MFR thereof is usually 5 g/10 min or higher, preferably 20 g/10 min or higher, more preferably 30 g/10 min or higher, and is preferably 100 g/10 min or less, more preferably 80 g/10 min or less. In cases when the MFR of the polyester-based thermoplastic elastomer is not less than the lower limit, the extrusion load tends to be low and the molding tends to be easy. Such MFR values are hence preferred. Meanwhile, MFR values not larger than the upper limit are preferred because the diameter of the extruded strand is apt to be stable.

The values of MFR of polyester-based thermoplastic elastomers herein are ones measured in accordance with JIS K7210-1999 under the conditions of a measuring temperature of 230° C. and a load of 21.1 N.

Polyester-based thermoplastic elastomers usable in the invention usually are block copolymers each including a hard segment which has crystallinity and a sot segment which has flexibility. The thermal properties of a polyester-based thermoplastic elastomer are mainly attributable to the hard segment, which has crystallinity, and the hardness thereof is mainly attributable to the soft segment, which has flexibility.

Examples of the polyester-based thermoplastic elastomer include: a block copolymer including a hard segment constituted of a cyclic polyester (in the invention, the term "cyclic polyester" means a polyester for which one or more dicarboxylic acids or alkyl esters thereof which included a dicarboxylic acid or alkyl ester thereof that had a cyclic structure were used as starting materials) (hereinafter, the hard segment is sometimes referred to as "cyclic polyester unit") and a soft segment constituted of a polyalkylene glycol (hereinafter, the soft segment is sometimes referred to as "polyalkylene glycol unit") (hereinafter, the block copolymer is often referred to as "cyclic polyester/polyalkylene glycol block copolymer); and a block copolymer including a hard segment constituted of a cyclic polyester and a soft segment constituted of a chain aliphatic polyester (in the invention, the term "chain aliphatic polyester" means a polyester for which one or more dicarboxylic acids or alkyl esters thereof which had a chain structure only were used as starting materials) (hereinafter, the soft segment is sometimes referred to as "chain aliphatic polyester unit") (hereinafter, this block copolymer is often referred to as "cyclic polyester/chain aliphatic polyester block copolymer"). Preferred of these are the cyclic polyester/polyalkylene glycol block copolymer.

Examples of the cyclic polyester/polyalkylene glycol block copolymer include: a block copolymer including a hard segment constituted of an aromatic polyester (hereinafter, the hard segment is sometimes referred to as "aromatic polyester unit") and a polyalkylene glycol unit (hereinafter, this block copolymer is often referred to as "aromatic polyester/polyalkylene glycol block copolymer"); and a block copolymer including a hard segment constituted of an alicyclic polyester (hereinafter, the hard segment is sometimes referred to as "alicyclic polyester unit") and a polyalkylene glycol unit (hereinafter, this block copolymer is often referred to as "alicyclic polyester/polyalkylene glycol block copolymer"). Preferred of these is the aromatic polyester/polyalkylene glycol block copolymer.

The aromatic polyester/polyalkylene glycol block copolymer is a known thermoplastic elastomer, as apparent form JP-A-10-130451, etc. So long as the block copolymer is a polymer containing a polyalkylene glycol unit, each block may be a homopolymer or a copolymer.

Although starting materials for the aromatic polyester unit are described below in detail, it is preferable that the copolymer should contain a hard segment for which polybutylene terephthalate was used as a starting material. Meanwhile, starting materials for the polyalkylene glycol unit are also described below in detail. It is, however, preferable that the copolymer should contain a soft segment for which polytetramethylene ether glycol was used as a starting material (hereinafter, the soft segment is sometimes referred to as "polytetramethylene glycol unit").

The polyester-based thermoplastic elastomer to be used in the invention is preferably a polybutylene terephthalate/polyalkylene glycol block copolymer, especially preferably a polybutylene terephthalate/polytetramethylene glycol block copolymer.

Representative examples of the alicyclic polyester/polyalkylene glycol block copolymer include one obtained from an alicyclic dicarboxylic acid (the term "alicyclic dicarboxylic acid" in this description means a compound configured of a cyclic aliphatic hydrocarbon and two carboxyl groups directly bonded thereto), an alicyclic diol, and a polyalkylene ether glycol as starting materials.

So long as the alicyclic polyester/polyalkylene glycol block copolymer is a polymer containing a polyalkylene glycol unit, each block may be a homopolymer or a copolymer. It is preferable that the alicyclic polyester unit should include a hard segment obtained from cyclohexanedicarboxylic acid and cyclohexanedimethanol as starting materials. Meanwhile, with respect to the polyalkylene glycol unit of the alicyclic polyester/polyalkylene glycol block copolymer, it is preferable that the unit should include a soft segment (polytetramethylene glycol unit) obtained from polytetramethylene ether glycol as a starting material.

Examples of the cyclic polyester/chain aliphatic polyester block copolymer include: block copolymers each including a hard segment constituted of an aromatic polyester and a soft segment constituted of a chain aliphatic polyester (hereinafter, the copolymers are often referred to as "aromatic polyester/chain aliphatic polyester block copolymers"); and block copolymers each including a hard segment constituted of an alicyclic polyester and a soft segment constituted of a chain aliphatic polyester (hereinafter the copolymers are often referred to as "alicyclic polyester/chain aliphatic polyester block copolymers").

Preferred of these are the aromatic polyester/chain aliphatic polyester block copolymers. More preferred of the aromatic polyester/chain aliphatic polyester block copolymers is a polybutylene terephthalate/chain aliphatic polyester block copolymer in which the aromatic polyester unit is constituted of polybutylene terephthalate. Preferred as the chain aliphatic polyester unit are ones obtained from any of chain aliphatic dicarboxylic acids having 4-10 carbon atoms, which are represented by sebacic acid and adipic acid, and from a chain aliphatic diol.

Preferred as starting materials for soft segments having flexibility are polyalkylene ether glycols. Examples of the polyalkylene ether glycols include linear and branched aliphatic ethers such as polymethylene glycol, polyethylene glycol, poly((1,2- and 1,3-) propylene glycol, polytetramethylene glycol, and polyhexamethylene glycol, and further include homopolymers or copolymers of alicyclic ethers, such as cyclohexanediol condensates and cyclohexanedimethanol condensates.

These ether units themselves each may be a random copolymer. It is also possible to use a block copolymer including a polyalkylene glycol unit. One of these may be used alone, or two or more thereof may be used in combination.

The number-average molecular weight of the polyalkylene glycol unit contained in the cyclic polyester/polyalkylene glycol block copolymer is preferably 600-4,000, more preferably 800-2,500, even more preferably 900-2,100. The number-average molecular weight of the polyalkylene glycol unit is a value determined through a measurement by gel permeation chromatography (GPC) and a calculation for polystyrene.

Only one polyalkylene glycol unit may be contained in the cyclic polyester/polyalkylene glycol block copolymer, or two or more polyalkylene glycol units differing in number-average molecular weight or component may be contained in the block copolymer.

Methods for producing the polyester-based thermoplastic elastomer are not particularly limited. For example, an aromatic polyester/polyalkylene glycol block copolymer to be obtained using an aromatic polyester and a polyalkylene ether glycol, among the cyclic polyester/polyalkylene glycol block copolymers, can be obtained by subjecting a chain aliphatic diol and/or an alicyclic diol each having 2-12 carbon atoms, an aromatic dicarboxylic acid or an alkyl ester thereof, and a polyalkylene ether glycol as starting materials to an esterification reaction or transesterification reaction to obtain an oligomer and condensation-polymerizing the oligomer.

As the chain aliphatic diol and/or alicyclic diol having 2-12 carbon atoms, use can be made of ones which are in common use as starting materials for polyesters. Examples of the chain aliphatic diol include ethylene glycol, propylene glycol, trimethylene glycol, 1,3-butylene glycol, 1,4-butylene glycol, and 1,6-hexene glycol. Preferred of these is 1,4-butylene glycol.

Examples of the alicyclic diol include 1,4-cyclohexene glycol and 1,4-cyclohexanedimethanol. Preferred is 1,4-cyclohexanedimethanol. One of these chain aliphatic diols and/or alicyclic diols each having 2-12 carbon atoms may be used alone, or a mixture of two or more thereof may be used.

As the aromatic dicarboxylic acid or alkyl ester thereof, use can be made of ones which are in general use as starting materials for polyester. Examples thereof include terephthalic acid and lower (in this description, the term "lower" means "having up to 4 carbon atoms") alkyl esters thereof, and isophthalic acid, phthalic acid, 2,5-norbornanedicarboxylic acid, 1,4-naphthalenedicarboxylic acid, 1,5-naphthalenedicarboxylic acid, and 2,6-naphthalenedicarboxylic acid and lower alkyl esters of these acids. Preferred of these are terephthalic acid and isophthalic acid. More preferred is terephthalic acid. With respect to these aromatic dicarboxylic acids or alkyl esters thereof also, one of these may be used alone or two or more thereof may be used in combination.

Examples of the polyalkylene ether glycol include, as mentioned above, linear and branched aliphatic ether glycols, such as polymethylene glycol, polyethylene glycol, poly(1,2- and 1,3-)propylene glycol, polytetramethylene glycol, and polyhexamethylene glycol, and homopolymers or copolymers of alicyclic ethers, such as cyclohexanediol condensates and cyclohexanedimethanol condensates.

These ether units themselves each may be a random copolymer. Preferred of these are linear and branched aliphatic ether glycols such as polymethylene glycol, polyethylene glycol, poly(1,2- and 1,3-)propylene glycol, polytetramethylene glycol, and polyhexamethylene glycol. More preferred are polymethylene glycol, polyethylene glycol, poly(1,2- and 1,3-)propylene glycol, and polytetramethylene glycol. Especially preferred is polytetramethylene glycol. One of these may be used alone, or two or more thereof may be used in combination.

Meanwhile, in the case of producing an alicyclic polyester/polyalkylene glycol block copolymer, an alicyclic dicarboxylic acid or an alkyl ester thereof may be used in place of the aromatic dicarboxylic acid or alkyl ester thereof used as a starting material for producing the aromatic polyester/polyalkylene glycol block copolymer.

Specifically, the block copolymer can be obtained by subjecting a chain aliphatic diol and/or an alicyclic diol each having 2-12 carbon atoms, an alicyclic dicarboxylic acid or an alkyl ester thereof, and a polyalkylene ether glycol as starting materials to an esterification reaction or transesterification reaction to obtain an oligomer and condensation-polymerizing the oligomer.

As the alicyclic dicarboxylic acid or alkyl ester thereof, use can be made of ones which are in general use as starting materials for polyesters. Examples thereof include cyclohexanedicarboxylic acid and lower alkyl esters thereof and cyclopentanedicarboxylic acid and lower alkyl esters thereof. Preferred of these are cyclohexanedicarboxylic acid and lower alkyl esters thereof. Especially preferred is cyclohexanedicarboxylic acid. With respect to these alicyclic dicarboxylic acids also, one of these may be used alone or two or more thereof may be used in combination.

The contents of the cyclic polyester unit and polyalkylene glycol unit in the cyclic polyester/polyalkylene glycol block copolymer are not limited. However, the contents thereof are usually in the following ranges from the standpoint of a balance between the crystallinity of the hard segment and the flexibility of the soft segment.

A lower limit of the content of the cyclic polyester unit in the cyclic polyester/polyalkylene glycol block copolymer is usually 10% by mass or higher, preferably 20% by mass or higher. An upper limit of the content of the cyclic polyester unit therein is usually 95% by mass or less, preferably 90% by mass or less, more preferably 80% by mass or less.

Meanwhile, there is no particular lower limit on the content of the polyalkylene glycol unit in the cyclic polyester/polyalkylene glycol block copolymer. However, the content thereof is usually 5% by mass or higher, preferably 10% by mass or higher, more preferably 20% by mass or higher. Furthermore, there is no particular upper limit on the content of the polyalkylene glycol unit therein. However, the content thereof is usually 90% by mass or less, preferably 80% by mass or less.

The content of the cyclic polyester unit in a block copolymer having a cyclic polyester unit can be measured by using nuclear magnetic resonance spectroscopy (NMR) and calculating the content from the chemical shift of the hydrogen atoms and from the content thereof. Likewise, the content of the polyalkylene glycol unit in a block copolymer having a polyalkylene glycol unit can be measured by using nuclear magnetic resonance spectroscopy (NMR) and calculating the content from the chemical shift of the hydrogen atoms and from the content thereof.

Preferred as the aromatic polyester/polyalkylene glycol block copolymer is a polybutylene terephthalate/polyalkylene glycol block copolymer, because this copolymer has an especially high crystallization rate and excellent shapability. The number of carbon atoms of the alkylene group of the polyalkylene glycol unit is preferably 2-12, more preferably 2-8, even more preferably 2-5, especially preferably 4.

One or more of trifunctional alcohols and tricarboxylic acids and/or esters thereof may have been copolymerized, in a small amount, in the cyclic polyester/polyalkylene glycol block copolymer, which is represented by the aromatic polyester/polyalkylene glycol block copolymer according to the invention, besides the ingredients described above. Furthermore, a chain aliphatic dicarboxylic acid, such as adipic acid, or a dialkyl ester thereof may be introduced as a comonomer ingredient.

Commercial products of the cyclic polyester/polyalkylene glycol block copolymer are also available. Examples of the commercial products include "Primalloy (registered trademark)" (manufactured by Mitsubishi Chemical Corp.), "Pelprene (registered trademark)" (manufactured by Toyobo Co., Ltd.), and "Hytrel (registered trademark)" (manufactured by DuPont).

One of polyester-based thermoplastic elastomers including the cyclic polyester/polyalkylene glycol block copolymer may be used alone, or two or more thereof may be mixed and used.

<Filament for Three-Dimensional Printer>

Methods for producing the filament for three-dimensional printer of the invention, which is produced from the polyester-based thermoplastic elastomer described above, are not particularly limited. Examples thereof include a method in which the polyester-based thermoplastic elastomer is molded by a known production method, usually extrusion molding or the like, or a method in which the polyester-based thermoplastic elastomer is produced so as to be in the form of a filament. For example, in the case where the filament for three-dimensional printer of the invention is obtained by extrusion molding, the temperature conditions are usually 80 to 300° C., preferably 100 to 280° C.

The filament diameter of the filament for three-dimensional printer of the invention depends on the capacity of the system to be used. However, the filament diameter is preferably 1.0 mm or larger, more preferably 1.5 mm or larger. Meanwhile, the filament diameter is preferably 5.0 mm or less, more preferably 4.0 mm or less, even more preferably 2.0 mm or less. From the standpoint of stability during feeding of the filament as a raw material, it is preferable that the filament should have an accuracy in filament diameter of within ±5% with respect to any measuring point on the filament.

When producing a crystalline soft resin molded article with a three-dimensional printer using the filament for three-dimensional printer of the invention, it is required to stably store the filament for three-dimensional printer and to stably feed the filament for three-dimensional printer to the three-dimensional printer.

It is hence preferable that the filament for three-dimensional printer of the invention should have been disposed, as a roll body obtained by winding the filament on a bobbin, in a sealed package or that the roll body should have been housed in a cartridge, from the standpoints of long-term storage, stable drawing-out, protection against environmental factors including moisture, prevention of twisting, etc.

Examples of the cartridge include one which not only contains the roll body obtained by winding the filament on a bobbin but also employs a vapor proofing material or moisture absorbent disposed inside and which has a structure wherein at least the parts other than the orifice part for drawing out the filament have been sealed.

From these standpoints, the water content of the filament for three-dimensional printer, in particular, is preferably 3,000 ppm or less, more preferably 2,500 ppm or less. Furthermore, it is preferable that the product including the filament for three-dimensional printer should have been sealed so that the filament has a water content of 3,000 ppm or less, more preferably so that the filament has a water content of 2,500 ppm or less.

It is preferable that the surface of the filament should have been coated with a silicone oil in order to prevent blocking (fusion bonding) of the filament for three-dimensional printer to itself when winding the filament to obtain a roll body.

For preventing the blocking, use may be made of a method in which an anti-blocking agent is incorporated into the thermoplastic polyester elastomer. Examples of the anti-blocking agent include silicone oils, inorganic fillers such as talc, aliphatic metal salts, and fatty acid amides. One of these blocking agents may be used alone, or two or more thereof may be used in combination.

In the case of a three-dimensional printer which runs on the FDM method, such as that which will be described layer, either a roll body obtained by winding the filament for three-dimensional printer on a bobbin or a cartridge including the roll body is usually disposed in or around the three-dimensional printer, and the filament is always continuously introduced from the cartridge into the three-dimensional printer during molding.

<Method of Molding with Three-Dimensional Printer>

In the production method of the invention, the polyester-based thermoplastic elastomer described above is subjected as a raw material to molding with a three-dimensional printer, thereby obtaining a crystalline soft resin molded article. Examples of methods for the molding with a three-dimensional printer include a fused deposition modeling method (FDM method), ink-jet technology, photoshaping technology, and gypsum powder deposition technology. Although the production method of the invention may be conducted using any of these methods, it is especially preferred to use the fused deposition modeling method among these. The case of the fused deposition modeling method is explained below as an example.

A three-dimensional printer which runs on the fused deposition modeling method generally includes a chamber, and is equipped, within the chamber, with a heatable platen, an extrusion head disposed on a gantry structure, a heating/melting vessel, and a raw material supply part including a filament guide or filament cartridge part, etc. Some three-dimensional printers have a configuration in which the extrusion head and the heating/melting vessel have been integrated together.

Since the extrusion head has been disposed on the gantry structure, the extrusion head can be arbitrarily moved over the X-Y plane of the platen. The platen is a platform for building thereon a desired three-dimensional object, supporting material, etc. It is preferable that the platen has been configured so that the platen is heated or thermally insulated to thereby obtain adhesion to the deposit or to enable the resultant crystalline soft resin molded article to have improved dimensional stability as a desired three-dimensional object. Usually, the extrusion head and/or the platen is movable in the Z-axis direction, which is perpendicular to the X-Y plane.

A raw material is drawn out from the raw material supply part, sent to the extrusion head with a pair of opposed rollers or gears, heated and melted in the extrusion head, and extruded from the nozzle at the end. While changing its position in accordance with signals sent on the basis of a CAD model, the extrusion head supplies the raw material to the platen and deposits the raw material layer-by-layer. After this step has been completed, the deposit is taken out from the platen, and the supporting material or the like is removed according to need and unnecessary portions are cut off. Thus, a crystalline soft resin molded article can be obtained as a desired three-dimensional object.

Examples of means for continuously supplying a raw material to the extrusion head include: a method in which a filament or a fiber is drawn out and supplied; a method in which a powder or a liquid is supplied from a tank or the like via a weigh-feeder; and a method in which pellets or granules are plasticated with an extruder or the like and this material is extruded and supplied. Most preferred of these is the method in which a filament is drawn out and supplied, that is, the method in which the filament for three-dimensional printer of the invention described above is drawn out and supplied, from the standpoints of step simplicity and supply stability.

In the case of supplying a filament-shaped raw material, it is preferable that a roll body obtained by winding the filament for three-dimensional printer on a bobbin should have been housed in a cartridge, as stated above, from the standpoints of stable drawing-out, protection against environmental factors including moisture, prevention of twisting or kinking, etc.

In a method generally used in the case of supplying a filament-shaped raw material, the filament is engaged with driving rolls, e.g., nip rolls or gear rolls, and supplied to the extrusion head while being drawn out. From the standpoint of enhancing the gripping of the filament by the engagement between the filament and the driving rolls to thereby stabilize the supply of the raw material, it is preferred to transfer minute irregularities beforehand to the surface of the filament or to incorporate an ingredient for increasing the resistance of friction with the engaging parts, such as an inorganic additive, spreading agent, pressure-sensitive adhesive, or rubber.

The polyester-based thermoplastic elastomer to be used as the raw material according to the invention has an advantage in that the temperatures for obtaining flowability suitable for extrusion are usually about 190 to 240° C. and this elastomer hence is applicable in a wider temperature range than raw materials which have hitherto been used in molding by three-dimensional printers. Consequently, in the production method of the invention, the temperature of the heating/extrusion head is set at usually 230° C. or lower, preferably 200 to 220° C., and the temperature of the platen is set at usually 80° C. or lower, preferably 60 to 70° C. Thus, a crystalline soft resin molded article can be stably produced.

The temperature of the molten resin which is being extruded from the extrusion head is preferably 180° C. or higher, more preferably 190° C. or higher. Meanwhile, the temperature thereof is preferably 250° C. or lower, more preferably 240° C. or lower, even more preferably 230° C. or lower.

Molten-resin temperatures not lower than the lower limit are preferred from the standpoint of extruding resins having high heat resistance. Such temperatures are preferred also from the standpoint of avoiding the trouble that fragments formed by thinly elongating the molten resin, which are generally called strings, remain in the molded article to impair the appearance. Meanwhile, in cases when the temperature of the molten resin is not higher than the upper limit, not only it is easy to prevent the resin from arousing a trouble such as pyrolysis, burning, smoking, odor emission, or sticking, but also the resin tends to be extruded at a high rate to improve the efficiency of molding. Such molten-resin temperatures are hence preferred.

It is preferable that the molten resin which is being extruded from the extrusion head should be in the shape of a strand having a diameter of preferably 0.01-1 mm, more preferably 0.02-0.2 mm. This is because the molten resin extruded in such a shape tends to bring about satisfactory reproducibility of a CAD model.

<Other Raw Material Ingredients>

Although the filament for three-dimensional printer of the invention and the raw material to be used in the production method of the invention each at least include the polyester-based thermoplastic elastomer described above, other resins, rubbers, additives, fillers, etc. can be suitably incorporate so long as the incorporation thereof does not lessen the effects of the invention.

Examples of the other resins include polyolefin resins, polyester resins, polyamide resins, styrene resins, acrylic resins, polycarbonate resins, polyvinyl chloride resins, polyolefin resins, and various elastomers (any resin which can be regarded as the polyester-based thermoplastic elastomer to be used in the invention is excluded from these resins). One of these resins may be used alone, or two or more thereof may be used in combination.

The amount of the other resins to be incorporated is usually 50% by mass of less, preferably 30% by mass or less, based on all the components.

Examples of the additives include antioxidants, acidic compounds and derivatives thereof, lubricants, ultraviolet absorbers, light stabilizers, nucleating agents, flame retardants, impact modifiers, blowing agents, colorants, organic peroxides, and the inorganic additive, spreading agent, and pressure-sensitive adhesive for increasing frictional resistance. One of these additives may be used alone, or two or more thereof may be used in combination. The amount of the additives to be incorporated, per 100 parts by mass of the polyester-based thermoplastic elastomer, is preferably 50 parts by mass or less, more preferably 30 parts by mass or less, even more preferably 10 parts by mass or less, especially preferably 5 parts by mass or less.

Examples of the fillers include: inorganic fillers such as talc, calcium carbonate, zinc carbonate, wollastonite, silica, alumina, magnesium oxide, calcium silicate, sodium aluminate, calcium aluminate, sodium aluminosilicate, magnesium silicate, glass balloons, cut glass fibers, milled glass fibers, glass flakes, glass powders, silicon carbide, silicon nitride, gypsum, gypsum whiskers, calcined kaolin, carbon black, zinc oxide, antimony trioxide, zeolite, hydrotalcite, metal fibers, metal whiskers, metal powders, ceramic whiskers, potassium titanate, boron nitride, graphite, and carbon fibers; and organic fillers including nature-derived polymers such as starch, fine cellulose particles, wood flour, tofu refuse, rice hulls, and bran and modifications of these. One of these may be used alone, or two or more thereof may be used in combination.

The amount of the fillers to be incorporated is usually 50% by mass or less, preferably 30% by mass or less, based on all the components. Meanwhile, the amount of the fillers to be incorporated, per 100 parts by mass of the polyester-based thermoplastic elastomer, is preferably 100 parts by mass or less, more preferably 80 parts by mass or less, even more preferably 60 parts by mass or less, especially preferably 40 parts by mass or less.

In the case of using other raw material ingredients such as those shown above, methods for using these ingredients are not particularly limited. It is, however, preferable that the ingredients should be dry-blended beforehand together with the polyester-based thermoplastic elastomer and the mixture be melt-kneaded in an ordinary manner, before the raw material is supplied to a three-dimensional printer.

<Applications of the Crystalline Soft Resin Molded Article>

The crystalline soft resin molded article of the invention is excellent in terms of flexible texture, shape reproducibility, shape retentivity, heat resistance, etc. Because of this, the molded article is suitable for use in applications including: stationery; toys; the covers of cell phones, smartphones, or the like; parts such as grips; school teaching aids; repair parts for domestic electrical appliances or OA appliances; various parts for motor vehicles, autobicycles, bicycles, etc.; and members such as building materials.

EXAMPLES

The contents of the invention are explained below in more detail by reference to Examples, but the invention should not be construed as being limited by the following Examples unless the invention departs from the spirit thereof. The values of the various production conditions and evaluation results in the following Examples mean preferred values of the upper or lower limits in embodiments of the invention, and a preferred range may be a range defined by the upper-limit or lower-limit value shown hereinabove and either the value in an Example or a combination of the values in Examples.

[Material Resins]

The following material resins were used. The hardness and thermal properties of each material resin were evaluated by the methods described in Evaluation Methods, which will be given later.

Material Resins for Examples

Commercial polybutylene terephthalate (PBT)/polytetramethylene glycol (PTMG) block copolymer (1):
Durometer D hardness, 28; melting peak temperature (A), 145° C.; crystallization peak temperature (B), 78° C.; half-value width of crystallization peak, 14° C.; difference between melting peak temperature (A) and crystallization peak temperature (B), 67° C.; MFR, 28 g/10 min; number-average molecular weight of PTMG unit, 2,000; content of PBT unit, 26% by mass; content of PTMG unit, 74% by mass.

Commercial polybutylene terephthalate (PBT)/polytetramethylene glycol (PTMG) block copolymer (2):
Durometer D hardness, 33; melting peak temperature (A), 185° C.; crystallization peak temperature (B), 138° C.; half-value width of crystallization peak, 15° C.; difference between melting peak temperature (A) and crystallization peak temperature (B), 47° C.; MFR, 30 g/10 min; number-average molecular weight of PTMG unit, 2,000; content of PBT unit, 37% by mass; content of PTMG unit, 63% by mass.

Material Resins for Comparative Examples

Thermoplastic urethane resin fiber ("NINJAFLEX (registered trademark)", manufactured by FENNER DRIVES, Inc.):
Durometer D hardness, 30; neither a melting peak temperature (A) nor a crystallization peak temperature (B) was observed with a DSC.

Ethylene/octene copolymer elastomer ("Engage (registered trademark) 8400", manufactured by the Dow Chemical Co.):
Durometer D hardness, 20; MFR, 36 g/10 min; melting peak temperature (A), 63° C.; crystallization peak temperature (B), 43° C.; half-value width of crystallization peak, 3° C.; difference between melting peak temperature (A) and crystallization peak temperature (B), 20° C.

[Evaluation Methods]

The hardness and thermal properties of each material resin, the shapability in molding thereof, and the heat resistance of each molded article obtained were evaluated by the following methods.

(Hardness)

Each material resin was examined for durometer D hardness (JIS K6253-1993).

(Thermal Properties)

The thermal properties were measured in the following manner by reference to JIS K7121-2012. A differential scanning calorimeter (Type DSC6200, manufactured by SII Nano Technology Inc.) was used, and the sample amount was 5 mg. The sample was heated from room temperature to 250° C. at 100° C./min, held for 3 minutes, then cooled to −30° C. at a cooling rate of 10° C./min, and held for 1 minute to examine the crystallization behavior. Subsequently, the sample was heated to 250° C. at a heating rate of 10° C./min to examine the melting behavior. On the crystallization curve and melting curve obtained, the crystallization peak temperature (B), half-value width of the crystallization peak, and melting peak temperature (A) were determined.

(Shapability)

Each material resin was examined for the occurrence of stringing at each of the extrusion temperatures shown in Table 1. The shapability was evaluated on the basis of the following criteria.

◯: No stringing occurs during molding, and beautiful molding is possible.

Δ: Slight stringing occurs during molding.

×: Considerable stringing occurs during molding, and beautiful molded articles cannot be obtained.

(Heat Resistance)

Each molded article obtained was placed for 20 minutes in a 100° C. Geer oven to measure the amounts of deformations (height and diameter of the cup). The deformation amounts relative to initial measured values were determined to evaluate the heat resistance on the basis of the following criteria.

◯: The deformation amounts are within ±5% of the initial values.

×: The deformation amounts exceed ±5% of the initial values.

Example 1

PBT-PTMG block copolymer (1) was used as a material resin and subjected to extrusion molding to prepare a continuous fiber having a cross-sectional diameter of 1.75 mm (filament for three-dimensional printer). Next, "BLADE-1", manufactured by Hotproceed, was used as an extrusion layer-by-layer deposition system running on the fused deposition modeling method, and molding was conducted to produce a cup-molded article (three-dimensional molded article) having an opening at the upper end as a three-dimensional object. The production conditions included the standard mode and a printer speed of 150 mm/sec. The platen temperature was set at 60° C., and each of the extrusion temperatures shown in Table 1 was used to conduct the molding. The molten resin was extruded in the shape of a strand with a diameter of 0.1 mm from the extrusion head. The shapability in this molding and the heat resistance of each molded article obtained were evaluated. The results thereof are shown in Table 1.

Example 2

A continuous fiber was obtained in the same manner as in Example 1, except that as a material resin, use was made of a resin composition obtained by melt-kneading 100 parts by mass of PBT-PTMG block copolymer (2), 0.1 part by mass of an organic peroxide ("Perbutyl O", manufactured by Nippon Oil & Fats Co., Ltd.), and 0.1 part by mass of ethylenebisoleamide. Molding was conducted in the same manner as in Example 1, and the shapability and the heat resistance of each molded article obtained were evaluated in the same manner. The results thereof are shown in Table 1.

Comparative Example 1

The fiber having a cross-sectional diameter of 1.75 mm which had been obtained by extrusion-molding a thermoplastic urethane resin was used as a continuous fiber to conduct molding in the same manner as in Example 1, and the shapability and the heat resistance of each molded article obtained were evaluated in the same manner. The results thereof are shown in Table 1.

Comparative Example 2

Molding was conducted in the same manner as in Example 1, except that a continuous fiber having a cross-sectional diameter of 1.75 mm was obtained using the ethylene/octene copolymer elastomer in place of the PBT-PTMG block copolymer (1). The shapability and the heat resistance of each molded article obtained were evaluated in the same manner as in Example 1. The results thereof are shown in Table 1.

TABLE 1

| | | | Example 1 | Example 2 | Comparative Example 1 | Comparative Example 2 |
|---|---|---|---|---|---|---|
| Shapability | Extrusion temperature (° C.)* | 185° C. | ◯ | ◯ | × | ◯ |
| | | 200° C. | ◯ | ◯ | × | ◯ |
| | | 215° C. | ◯ | ◯ | × | ◯ |
| | | 230° C. | ◯ | ◯ | × | ◯ |
| | | 245° C. | ◯ | ◯ | Δ | ◯ |
| Heat resistance | | | ◯ | ◯ | ◯ | × |

*Temperature of molten resin being extruded from extrusion head

As shown in Table 1, it can be seen that according to the filaments for three-dimensional printer of the invention and the method of the invention for producing a crystalline soft resin molded object, crystalline soft resins can be molded in a wide temperature range without excessively elevating the extrusion temperature for the three-dimensional printer. The molded articles obtained in Examples 1 and 2 had a flexible and satisfactory texture. The molding in Examples 1 and 2 was repeatedly performed and, as a result, the filaments for three-dimensional printer of the invention were ascertained to be excellent in terms of shape reproducibility and shape retentivity.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 5, 2014 (Application No. 2014-181214), the entire contents thereof being incorporated herein by reference.

INDUSTRIAL APPLICABILITY

According to the filament for three-dimensional printer of the invention and the method of the invention for producing a crystalline soft resin molded article, a crystalline soft resin can be molded by a three-dimensional printer in a wide temperature range without excessively elevating the extrusion temperature for the three-dimensional printer. Furthermore, according to the filament for three-dimensional printer of the invention and the method of the invention for producing a crystalline soft resin molded article, it is possible to obtain a crystalline soft resin molded article which is excellent in terms of heat resistance, flexible texture, shape reproducibility, shape retentivity, etc. Because of this, the crystalline soft resin molded article of the invention is suitable for use in applications including: stationery; toys; the covers of cell phones, smartphones, or the like; parts such as grips; school teaching aids; repair parts for domestic electrical appliances or OA appliances; various parts for motor vehicles, autobicycles, bicycles, etc.; and members such as building materials.

The invention claimed is:

1. A filament for three-dimensional printer molding which comprises a polyester-based thermoplastic elastomer wherein a durometer D hardness (JIS K6253-1993) is 40 or less and thermal properties measured with a differential scanning calorimeter (DSC) satisfy the following conditions:
   a melting peak temperature (A) is 120 to 220° C. by heating at 10° C./min;
   a crystallization peak temperature (B) is 60 to 160° C. by cooling at 10° C./min; and
   the crystallization peak observed during cooling at 10° C./min has a half-value temperature width of 10 to 30° C.;
   wherein the polyester-based thermoplastic elastomer is a polybutylene terephthalate-polyalkylene glycol block copolymer.

2. The filament for three-dimensional printer according to claim 1, wherein the thermal properties of the polyester-based thermoplastic elastomer which are measured with a differential scanning calorimeter (DSC) further satisfy the following:
   the difference between the melting peak temperature (A) and the crystallization peak temperature (B) is 40 to 80° C.

3. The filament for three-dimensional printer according to claim 1, which has a filament diameter of 1.0 to 5.0 mm.

4. A roll body of the filament for three-dimensional printer according to claim 1.

5. A cartridge to be mounted in or on a three-dimensional printer, which contains the roll body according to claim 4 therein.

6. A method for producing a crystalline soft resin molded article,
   wherein the filament of claim 1 is used as raw material and
   the raw material is molded with a three-dimensional printer.

7. The method for producing a crystalline soft resin molded article according to claim 6, wherein the thermal properties of the polyester-based thermoplastic elastomer which are measured with a differential scanning calorimeter (DSC) further satisfy the following condition:
   the difference between the melting peak temperature (A) and the crystallization peak temperature (B) is 40 to 80° C.

8. The method for producing a crystalline soft resin molded article according to claim 6, wherein a temperature of a molten resin which is extruded from an extrusion head of the three-dimensional printer is 180 to 250° C.

9. The method for producing a crystalline soft resin molded article according to claim 6, wherein the molding with the three-dimensional printer is based on a fused deposition modeling method.

10. The method for producing a crystalline soft resin molded article according to claim 6, wherein the molding with the three-dimensional printer is conducted by extruding a molten resin from the extrusion head into a strand shape having a diameter of 0.01 to 1 mm.

* * * * *